April 16, 1957
J. KOLBE
2,788,984
FORCE DIVERTER SPRING RELEASE FOR TWO
MOTION CENTER BANKING CARS
Filed Feb. 4, 1955
2 Sheets-Sheet 1
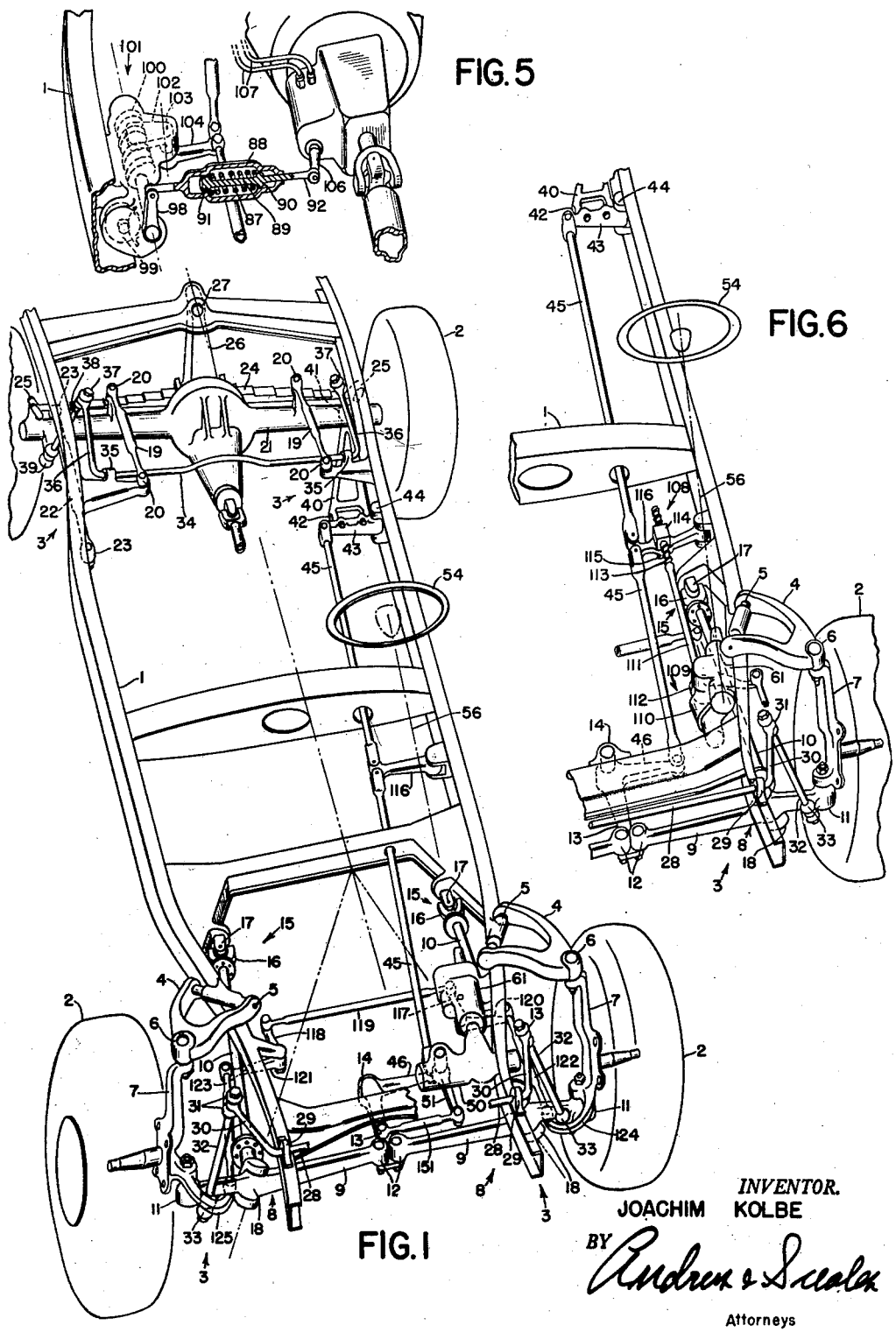
INVENTOR.
JOACHIM KOLBE
BY
Andrew & Scala
Attorneys

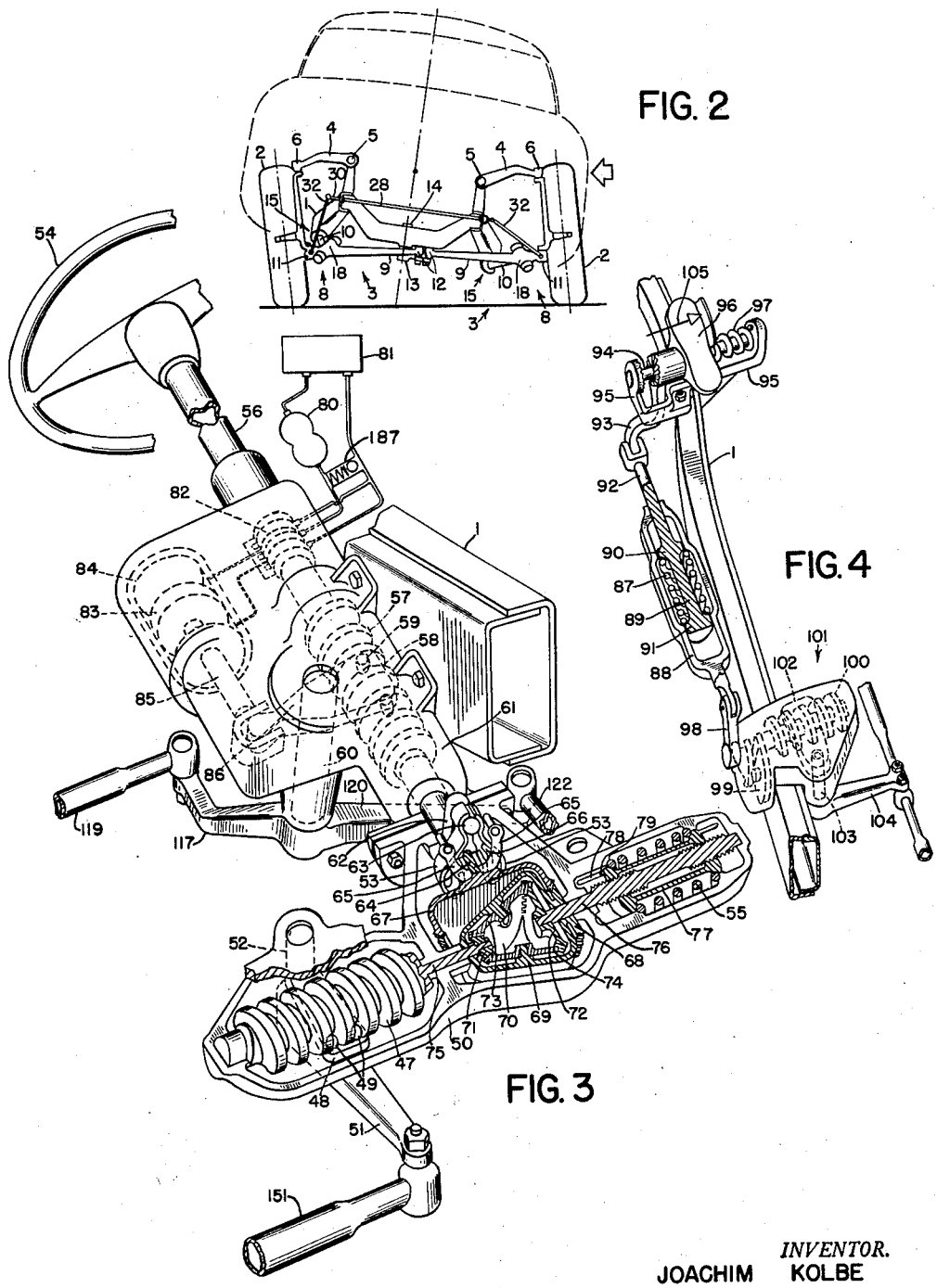

United States Patent Office 2,788,984
Patented Apr. 16, 1957

2,788,984

FORCE DIVERTER SPRING RELEASE FOR TWO MOTION CENTER BANKING CARS

Joachim Kolbe, Menomonee Falls, Wis.

Application February 4, 1955, Serial No. 486,103

21 Claims. (Cl. 280—112)

This invention relates to inward banking motor vehicles, and in particular to release mechanisms including resilient means for control and timing devices arranged between the superstructure and the running gear of such vehicles.

The invention relates more specifically to an improvement in the release mechanism of so-called force diverters as described in co-pending application Serial No. 400,313, filed December 24, 1953, by this inventor. The force diverters are disclosed as applied to banking vehicles of the kind, wherein two motion centers are provided about which the superstructure simultaneously turns in reaction to centrifugal forces during curve ride, one motion center being located near the road and serving as a wheel-and-axle suspension motion center, and the other motion center being located above the height of the center of mass of the vehicle as in true pendulum cars, or near its height and serving as a banking motion center. United States Patents No. Re. 21,605, and Re. 21,840, disclosing link mountings, and No. 2,576,686 and No. 2,580,558 disclosing banking arm mountings, all granted to the present inventor are also referred to by way of example of vehicles having two motion centers for the superstructure.

The force diverter in some of its embodiments constitutes an irreversible worm gear unit in combination with a speed up mechanism, carried by the superstructure and released by a shifting weight whenever the vehicle negotiates a curve and is under the influence of centrifugal forces.

The principal object of this invention is to replace the shifting weight by resilient means operated in various manners to thereby secure a more positive and reliable action and reduce the weight addition otherwise needed to actuate the release.

Another object is to co-employ existing mechanisms powered either by the driver or the engine to change the pressure of the release spring and to secure the desired force diverter release.

Another object of the invention is to secure a presetting of the resilient means according to this invention at a time convenient to the driver for a future release of the force diverter device. The actual release occurring automatically at the specific moment of banking turn.

Another, more specific object is to employ a small initial turn of the steering hand wheel for the release of the force diverter and to absorb the remaining turn of the steering hand wheel without further influence on the banking position of the superstructure.

A related object is to absorb all turn of the steering hand wheel, eliminating any influence on the force diverter during parking operation of the steering mechanism or whenever the vehicle is moving at a rate of speed insufficient to warrant banking.

Another object is to secure benefits in the operation of the release mechanism from a hydraulically or otherwise operated power assist unit which serves primarily as an assist for the steering operation.

Another object is to incorporate the speed-up mechanism required in some of the modifications of the force diverter into the distribution gear operating either the force diverter or the absorbing means for additional turn of the steering wheel.

Another object is to provide means for the operation of the release mechanism which can be set to operate continuously but at a rate different from that of running gear vibrations which might build up without the benefit of the structure of this invention.

Another object is to provide various locations favorable for the selected units cooperating in the regulation of the banking motion for the superstructure.

Another object is to provide a banking arm and tie control linkage designed to accommodate the mechanism according to this invention.

Another object of this invention is to exert control over relative lateral movement between running gear and superstructure by permitting banking motion to take place within small defined sections interrupted by complete stops until the full lateral shift is secured.

Another object is to provide modifications in structure to suit the demands for simplicity with resulting economy and convenience of operation.

According to the invention relative lateral shifting between the superstructure and the running gear is possible only after actuation of release mechanism responsive to pressure resulting from resilient means actuated in effect by either the driver or by engine forces or both and in some of the embodiments disclosed actuated at a convenient moment and especially before entering the curve or before leaving it.

The drawings furnished herewith illustrate the invention as presently contemplated and described hereinafter.

In the drawings:

Fig. 1 is a perspective view of a vehicle suspended on the front wheels and a rear axle in a manner which secures a banked position for its superstructure during curve ride, and including the improved elements of the force diverter unit and their relative location according to this invention.

Fig. 2 is a schematic front elevation of some of the structure shown in Fig. 1, with the superstructure turned into a banked position.

Fig. 3 is a schematic perspective view of a force diverter release mechanism including a release spring according to this invention in combination with the vehicle steering mechanism.

Fig. 4 is a perspective view of a force diverter release mechanism including resilient means arranged suitably for presetting by the driver according to this invention.

Fig. 5 is a perspective view of a force diverter release mechanism including resilient means operated continuously during vehicle engine operation and arranged according to this invention; and Fig. 6 is a perspective view of part of the vehicle shown in Fig. 1 and of a modified arrangement for locating and operating the improved elements of the force diverter and steering units according to this invention.

This invention is applied to banking cars as disclosed in some of applicant's previous patents and patent applications and in which a basic structure is provided in the form of a corresponding running gear to bank the vehicle superstructure automatically during curve ride, and an additional basic structure exists in the form of a force diverted interposed between the running gear and the superstructure to oppose the banking turn. The invention is based on the recognition that the release for the operation of the force diverter can be preset in advance of the desired moment of banking. An opportunity therefore is available to provide release mechanism responding not to centrifugal force but to resilient means operated in advance of the superstructure banking. Only where a centrifugal force effect active on the superstructure and resilient pressure means activated previously now occur simultaneously will the superstructure be able to bank. The force diverter release is always secured in one direction only and therefore still resists the buildup of running gear vibrations.

The drawings illustrating the invention in detail are showing the spring release mechanism as applied to banking car structures such, for instance, as that disclosed in Figs. 1, 2, and 6, although the invention is applicable to all structures with separate oscillation and banking motion centers. The vehicle structure shown as one possible embodiment in Figs. 1 and 2 comprises a superstructure represented more positively by the chassis frame 1 and supported by the wheels 2 on the road. The wheels 2 are arranged in pairs, one pair at the front end and the other pair at the rear end of the superstructure. The wheels of each pair are disposed on opposite sides of the superstructure and are equally spaced from the longitudinal vertical center plane of the superstructure.

The wheels 2 are secured to the superstructure 1 by wheel or axle carriers 3, which provide for vertical oscillation of each wheel relative to the superstructure. The wheel or axle carriers 3 are arranged in pairs similar to the wheels and each pair is employed for connecting the corresponding pair of wheels to the superstructure.

The front wheels 2 and their corresponding wheel carriers 3 form a front pair of roll banking arms which support the front end of the superstructure. Each front wheel carrier 3 consists of an upper control arm 4 pivotally attached to the frame 1 by the substantially longitudinally extending hinge 5 and connected by the ball and socket joint 6 to the wheel supported member 7 which also serves as a steering kingpin, and of a lower suspension arm 8 comprising a transversely extending leg 9 and a longitudinally extending leg 10 which also serves as a vehicle main support torsion spring for the corresponding share of the weight of the car.

The transversely extending leg 9 of each lower suspension arm 8 is pivoted at its outer end by the universally movable ball and socket joint 11 to the wheel supported member 7 and at its inner end by the universally movable ball and socket joint 12 to a longitudinally extending lever 13 pivoted by a substantially vertically placed pivot 14 to the frame 1. The lever 13 serves both transversely extending legs 9 as a common inner end support.

The longitudinal extending leg and torsion spring 10 of each lower suspension arm 8 is attached at its rearward end to the frame 1 by a universal joint 15 comprising a substantially horizontally extending axis shaft 16 and a substantially vertically extending axis shaft 17. The forward end of the torsion spring 10 is pivotally connected to the transversely extending leg 9 by a hinge 18 extending preferably inclined towards the longitudinal and transverse center planes extending intermediate the pairs of wheels of the vehicle. The hinge 18 will be referred to hereinafter as a kingpin banking hinge.

The rear wheel or axle carriers 3 comprise, in the vehicle illustrated in Fig. 1, an upper pair of radius rods 19, connected by universally movable joints such as, for instance, ball and socket joints 20 at their forward ends to the frame 1 and at their rearward ends to the rigid axle housing 21, and further comprise a lower radius rod 22 arranged on one side of the vehicle and connected by the universally movable joints 23 at its forward end to the frame 1 and at its rearward end to the axle housing 21.

On the other side of the vehicle remote from lower radius rod 22 a corresponding radius rod which also serves as a track rod and as part of a front to rear tie is provided as described hereinafter.

A transversely extending rear spring 24 constitutes a common resilient means for the pair of rear axle carriers 3. The spring 24 is attached by the shackles 25 to the axle housing 21 and by the center support column 26 to the frame 1. A longitudinally extending pivot 27, located approximately in height of the mass center of the superstructure 1 is interposed between the support column 26 and the frame 1.

A sway bar 28 is attached in the front of the vehicle by the bearings 29 to the frame 1. The outer ends of the sway bar 28 form longitudinally extending sway bar arms 30 which are connected by pivotal or rubber bearings 31 to inclined sway bar shackles 32. The shackles 32 are connected to the outer ends of the corresponding arms 9 by pivotal or rubber bearings 33, which are spaced farther apart than the upper shackle bearings 31.

In the rear of the vehicle a similar sway bar 34 may be added and is illustrated as being supported by the bearings 35 on the frame 1 and comprising longitudinally extending arms 36 on either end, which are connected by upper pivotal or rubber bearings 37 to the inclined shackles 38 and with lower pivotal or rubber bearings 39, also spaced farther apart than the upper pivots 37, connecting the shackles 38 to the rear axle housing 21.

Describing the operation of the mechanism disclosed, reference is made to co-pending application Serial No. 448,481, filed August 9, 1954, now Patent No. 2,739,658, dated March 27, 1956. The use of the longitudinally extending legs 10 of the lower front suspension arms 8 as vehicle main support torsion springs permits an oscillation turn of the transversely extending legs 9, increasing the torsional deflection of the springs with upward movement of the wheels either individually or as a pair, and decreasing it with downward movement.

For oscillation movement of the front wheels as a pair no influence is exerted on the sway bar 28, while individual wheel oscillation movement will be resisted by the sway bar 28 and oppositely directed wheel oscillation movement will be resisted to twice the extent of single wheel oscillation movement for the same distance of travel of each wheel.

Oppositely directed wheel oscillation movement is typical for curve ride of the vehicle, the curve outside wheel receiving additional loading and the curve inside wheel decreasing its loading under the influence exerted by centrifugal force on the vehicle. Any tendency of the sway bar 28 to deflect within the mechanism of this invention causes an upwardly directed reaction load on the curve outside against the frame 1 and a downwardly directed reaction load on the curve inside against the frame 1.

Whenever the reaction loads of the sway bar 28 are allowed to become effective during release of the so-called force diverter as described hereinafter, the kingpin banking hinges 18, the universal joints 15, and the lever arm 13 with the ball and socket joints 12 will turn about their respective axes and permit the superstructure 1 to turn about its own longitudinally extending center of mass axis. This turn motion of the superstructure will be progressively increased and accelerated due to the inclination of the sway bar shackles 32. In the rear of the vehicle the sway bar 34 with the shackles 38 operate similarly, lifting the superstructure on the curve outside and lowering it on the curve inside while turning it about the single column support pivot 27 which is located substantially in the height of the center of mass of the superstructure.

In the rear of the vehicle illustrated in Fig. 1, the banking of the superstructure about the hinge 27 as described above, will be accompanied by a normal deflection of the main vehicle support resilient means, similarly as in the front, and as is typical for standard cars and in the same manner as if the vehicle were blocked against the banking turn. The center support column 26 thereby will move into a position inclined towards the outside of the curve, shifting the longitudinally extending pivot 27, located in the height of the center of mass of the superstructure, laterally. This motion of the center of mass of the vehicle superstructure would in standard cars be opposed by the sway bar 34, while in the structure illustrated the sway bar 34 will not deflect but will turn the superstructure into the desired banked position, while guided by the shackles 38.

The track rod referred to above and carrying reference character 40 is pivotally connected to the rear axle housing 21 by ball and socket joint 41 and hingedly connected by the substantially horizontally and transversely extending hinge 42 to the lever arm 43 which is hingedly connected by the substantially vertically extending hinge 44 to the frame 1.

To secure proper track holding between the front and rear pairs of wheels of the vehicle two longitudinally extending tie rods 45 are interposed between the front lever arm 46, extending transversely and forming a bell crank with the longitudinally extending lever 13, and the lever arm 43 in the rear in combination with a support lever arranged intermediate the levers 46 and 43 as described hereinafter.

The structure described so far will cause the superstructure to bank, whenever the vehicle negotiates a curve, whereby a simultaneous relative redisplacement of structural members takes place as follows: The wheels on the outside of the curve tend to move upwardly relative to the frame and to increase the stress in the corresponding vehicle main support springs. The wheels on the inside of the curve tend to move downwardly and to decrease the stress in the corresponding vehicle main support springs. A corresponding deflection of the sway bar tends to turn the superstructure about its banking motion center located in or near the height of the center of mass of the superstructure. The vehicle main support springs shift into their new locations as shown for the front of the vehicle in Fig. 2, simultaneously increasing and decreasing their relative stresses to correspond to the stresses typical for standard cars of similar construction stressed during curve ride. The inclined sway bar shackles secure an accelerated and increased banking turn for the superstructure.

The described banking turn of the superstructure is controlled by a force diverter device for reasons and in a manner similar to that described in co-pending application Serial No. 400,313, referred to above, with modifications for its release mechanism according to this invention.

The force diverter comprises in the modification illustrated in Fig. 3, an irreversible worm gear of the cam and lever type with gear 47, lever 48 and studs 49 all placed in a housing 50 and arranged to turn a lever 51 about a shaft 52 and forming an integral part with lever 48 whenever the worm gear turns. According to this invention the turn of the worm gear is secured by an increase in the compression of the device spring 53 caused by a turn of the steering hand wheel 54, unless such turn of the worm gear is resisted by natural opposition against lateral banking shifting between the vehicle running gear and the superstructure. In that case the turn of the hand wheel is absorbed in deflection of first the device spring 53 and additionally in deflection of the absorption spring 55 as explained hereinafter.

Describing the structure illustrated in Fig. 3 in detail, the steering hand wheel 54 is carried by the steering column 56 to which is attached the steering worm gear 57 operably engaging the lever 58 by means of studs 59 to form a typical vehicle steering gear unit of the cam and lever type. The lower end of the steering column 56, the worm gear 57 and the lever 58 with the studs 59 as well as the shaft 60 are enclosed by the steering gear housing 61 which is carried by the frame 1.

The steering column 56 carries on its lower end the device spring operating lever 62 which forms on its outer end a bell crank arm 63 extending in a direction parallel to the steering column. A separate shaft 64 with an axis in line with the steering column axis and arranged to turn within the housing 50 rigidly flanged to the steering gear housing 61 supports a pair of suitably shaped leaf springs constituting the device spring 53, with their upper ends leaning, if desired with a small amount of precompression, against the bell crank arm 63. The separate shaft 64 carries also a pair of arms 65 extending upwardly and outwardly from the center of the shaft and designed to restrict the amount of deflection of either leaf spring whenever such deflection takes place with operation of the steering hand wheel in either direction. Rigid studs 66 are attached to said arms 65 to keep the two leaves of spring 53 apart and maintain proper precompression.

Rigidly connected to the shaft 64 at its lower end is a drive pinion 67 arranged to mesh with a drive ring gear 68 placed at right angles thereto and forming an integral part with a differential case 69 for a differential assembly 70. This assembly 70 includes two differential side gears 71 and 72 as well as two pinion gears 73 and 74 rotatably carried by the differential case 69.

The side gear 71 is mounted to the force diverter shaft 75 which carries the worm gear 47. The side gear 72 is mounted to the absorption spring shaft 76 which is externally threaded on its outer end to engage an internally threaded member 77 which during the turn of shaft 76 will shift sidewardly, increasing the pressure on the absorption spring 55. The absorption spring 55 is placed under pressure between two suitably shaped bearing walls which form an integral part of the housing 50. A rail guide 78 extending longitudinally within the housing 50 and a corresponding key way 79 on the member 77 prevents turning of the member 77 relative to the housing 50.

A tie rod 151 is pivotally connected at one end to the force diverter lever 51 and at the other end to the longitudinally extending lever 13 adjacent to the pair of ball and socket joints 12, carried by lever 13. The levers 13 and 51 thus can move in unison only, and undesirable lateral shifting of the running gear is blocked.

Explaining the operation of the device, three conditions have to be considered.

Describing condition 1, whenever the vehicle enters a curve at sufficient speed to warrant banking of the superstructure a turn of the steering hand wheel 54 will, besides positioning the vehicle front wheels to initiate the curve ride, increase the pressure in the corresponding leaf of the device spring 53. At higher speeds this turn of the steering hand wheel will be small and the upper end of the operated leaf, pushed along the circular travel path of the bell crank arm 63 by the arm will not touch the corresponding restricting arm 65. However, the increase in spring pressure will be sufficient to turn the shaft 64 including all parts carried by it and until spring balance between the two leaves of the device spring 53 is restored. This turn of the shaft 64 will turn the drive pinion gear 67, the drive ring gear 68 and the differential case 69, since under the described condition maximum banking is desired and all turning of the hand wheel should be made available for the turn of the force diverter shaft 75. The absorption spring 55 is precompressed sufficiently to resist any lateral shifting of the member 77 and with it any turn of the absorption spring shaft 76 will be avoided under the pressure of the forces active at that time. The differential assembly 70 therefore will begin to operate, whereby the turn of the drive ring gear 68 will, besides turning the differential case 69, cause a relative turn between the pinion gears 73 and 74 and the side gear 71 operating the force diverter shaft 75, while the side gear 72 operating the absorption spring shaft 76 will not participate in the turning at all. The turn of the force diverter shaft 75 will operate the worm gear and the operating levers 48 and 51, permitting the superstructure to bank.

Describing condition 2, whenever the vehicle steering mechanism is operated for parking purposes or at a vehicle speed insufficient to warrant banking, the turn of the hand wheel 54 will, besides positioning the vehicle front wheels as desired, increase the pressure in the corresponding leaf of the device spring 53 until its upper end rests against the corresponding arm 65 and from thereon will continue to turn the shaft 64 including all parts carried by it, since for parking turns the steering hand wheel 54 will usually be turned many times the circular section represented by the distance between the bell crank 63 of the spring operating lever 62 in upright neutral position and the corresponding restricting arm 65. This turn of the shaft 64 will cause a turn of the drive pinion 67 and the drive ring gear 68. However, since the superstructure will resist any displacement relative to the vehicle running gear, no curve ride and speed being available, the resistance of the force diverter worm gear shaft 75 against turning will be so great that the differential assembly 70 will begin to operate, whereby the turn of the drive ring gear 68, will, besides turning the differential case 69, cause a relative turn between the two pinion gears 73 and 74 and the absorption spring shaft 76 and will cause the member 77 to move laterally, increasing the spring pressure of the absorption spring 55.

Describing condition 3, whenever the vehicle steering hand wheel 54 is turned at a greater angle than that needed to shift the outer end of the corresponding device spring leaf of the spring 53 against the restricting arm 66, and sufficient speed is available to make banking desirable a successive operation of the force diverter shaft 75 and the absorption spring 76 will result with the two leaves of the device spring 53 maintaining their operative effect, no matter how far the shaft 64 has been turned and until such time as is needed to secure operation of the force diverter, since the device spring 53 is responsive to less pressure than the absorption spring 55 and will operate sooner than spring 55.

Under all three conditions will the device spring 53 be at least partly stressed before the force diverter mechanism can come into action.

Since the force diverter with its irreversible worm gear 47 and lever 48 provides in effect a rigid arm extending from the frame and connected to the linkage of the vehicle running gear in a manner prohibiting any banking movement of the superstructure relative to the running gear, unless released for movement according to this invention, the use of the steering hand wheel turn for compression of a resilient means which in turn activates the force diverter seems practical, as long as the amount of turn needed to secure the necessary turns of the force diverter worm gear is small enough to secure banking even at high speed, where very little actual steering turn is available.

In the modification illustrated in Fig. 3 the speed up mechanism needed to transform an approximately 20° turn of the hand wheel, which would represent about 1° turn of the front wheels about their kingpin axes, into an approximately 2½ times 360° turn of the worm gear 47 is furnished by the gear and differential assembly comprising parts 67–71, itself. A turn of shaft 64 with drive pinion 67 will give a multiplied turn to the drive ring gear 68 with differential case 69, which, with the differential side gear 72 considered blocked, will further accelerate the side gear 71 turn, because the differential pinion gears 73 and 74 turning about the fixed differential side gear 72 during the turn of the differential case 69 as part of the drive ring gear 68 are of considerably larger diameter than the differential side gear 71.

The differential assembly works as a reduction gear unit where the differential side gear 71 remains blocked and the differential side gear 72 operating the absorption spring 55 is turning. This constitutes a desirable feature since fewer turns will be needed to operate the spring 55 and that part of the assembly can be kept more compact.

While the force needed to turn the force diverter worm gear and release the mechanism for banking operation is relatively small, the release device according to the invention will operate the more effectively the smaller the angular turn of the hand wheel can be kept and the stronger the release spring 53 can be designed, whereby a corresponding increase in resilient resistance of the absorption spring 55 is needed since spring 55 will always have to furnish greater relative resistance than spring 53 to secure full operation of spring 53 before spring 55 begins to operate.

The hydraulically operated power steering assist assembly therefore is schematically illustrated in Fig. 3 as comprising a pump 80 with reservoir 81, a control valve assembly 82, a piston 83 operating within a cylinder 84, and a piston rod 85 transmitting its hydraulically forced movement to a lever arm 86 extending in opposite direction from the inner steering lever arm 58. A by-pass valve 187 is indicated between outgoing and incoming oil flow, as is typical for most hydraulically operated power steering assist systems. The control valve 82, the piston 83, the cylinder 84, and the piston rod 85 are all placed within the steering gear housing 61. Any power steering assist arrangement serving the same purpose, although arranged differently or operated by different means would not basically affect the workings of the force diverter release mechanism according to this invention and should be considered a part of this disclosure.

Another modification for providing and operating a force diverter release spring according to this invention is illustrated in Fig. 4, wherein a precompressed coil spring 87 is placed within a housing 88 and operated by a piston 89 equipped with a pair of suitably shaped piston plates 90 and 91 and with a piston rod 92. The unit is pivotally connected at the outer end of the piston rod 92 to a lever 93 turning about a shaft 94 which is supported at its ends by a support bracket 95 attached to the vehicle frame 1. A forward or backward movement of the outer end of the lever 93 is secured by a double lever 96 integrally attached to lever 93 and constituting a foot rest operated by the driver. A spring 97 extending between the support bracket 95 and the double lever 96 will keep the double lever 96 firmly pressed with support of serrations on the meshing parts in any selected position against the support bracket 95. The free end of the housing 88 is pivotally connected to the lever 98 which, by means of a train of gears 99 constituting the speed up device turns the irreversible worm gear 100 of the force diverter 101, which comprises the corresponding inner lever 102 of the cam and lever arrangement, the vertical shaft 103 and the outer lever 104. This lever is pivotally attached to suitable linkage of the banking car running gear, depending on the selected location of the force diverter, such, for instance, as the front to rear tie rods 45.

In the operation of this modification of the invention the driver will during approach of a curve set the lever 93 into a forward position for instance by pressing the double lever sidewardly in the direction of arrow 105 and by pressing the rearward end of the lever with his heel downwardly. The spring 97 will keep the levers 93 and 96 in this selected position and an increase in compression of the release spring 87 will be secured. The upper end of the lever 98 will have a tendency to turn forwardly, a turn however, which can take place only when the vehicle enters the curve at appropriate speed and the superstructure under the influence of the centrifugal force, directly or indirectly, depending on the system of banking suspension chosen tends to bank and shift the corresponding linkage to which the force diverter is attached longitudinally forward or back. Since at that moment both the inner and the outer lever of the force diverter are exposed to forces cooperating in an effort to overcome resistance against the shifting of the whole suspension and running gear system, the superstructure will bank. The operation is similar to that of a release mechanism for a car jack during the lowering process of the vehicle from its jack-lifted position.

Action in the opposite direction will result from compression increase of the device spring 87 in the opposite direction when initiated by the driver and not resisted by the banking linkage.

While Fig. 4 illustrates the mechanism as being operated by the driver's foot, operation by hand, eventually in combination with the direction indicator lever used in present day cars, is feasible, especially where vacuum or other power assist is made available.

Fig. 5 illustrates a modification of the invention similar in some respects to that shown in Fig. 4 and described above. Identical reference characters therefore are used where identical actions are maintained. The devices differ in that the outer end of the piston rod 92 is attached to a power turned crank lever 106. This turn might be secured mechanically, by connecting the shaft by means of appropriate gears to the engine or the transmission, as shown, or it may be accomplished hydraulically as indicated by the connecting ends 107 of a hydraulic fluid circulating system, or by electrical or vacuum power supply. The idea on which the device is based is the use of a periodically compressed and decompressed resilient means which under compression is strong enough to operate the force diverter whenever resistance in the banking running gear against operation vanishes, as when the vehicle enters a curve. The periods of operation will have to be chosen different from running gear vibrations typical for the selected suspension system. Such vibrations have been measured by this inventor as occurring at a rate of 40 per second. A periodic turn of between 2 and 10 rotations per second for the crank lever 106 therefore seems safe and yet of sufficient frequency to secure the proper amount of banking within desirable time limits.

Fig. 5 illustrates the device in zero position. A full turn of crank lever 106 will once compress the device spring 87 to the left and once to the right and open the way for operation of the force diverter and the full banking mechanism, whereby the banking turn might well take place in sections but of sufficient frequency to avoid the feeling of being exposed to shocks on the part of the passengers whenever the spring is compressed in the direction not supported by the natural tendency of the running gear to shift relative to the superstructure.

Fig. 6 illustrates a part of the banking car running gear and frame identical to that shown in Fig. 1 but connected to and supporting a modified form of a vehicle steering operated release mechanism. The steering gear housing 61 is supported by the frame, and the force diverter mechanism 108 is separated from the differential unit 109. This unit is relocated to operate in a direction longitudinal with regard to the direction of the vehicle. The differential unit 109 however is still integrally attached to the steering gear mechanism and enclosed in a housing 110 which might form a part of housing 61. A drive shaft 111 connected at its forward end by the universal joint 112 to the corresponding shaft of the differential unit 109 and forming with its rearward end the worm gear 113 of the force diverter serves to bridge the distance between the differential unit 109 and the force diverter mechanism 108. This mechanism 108 comprises also a support block 114 connected by the vertically extending pivot 115 to the support lever 116 and serving as a bearing for the worm gear 113 itself. The support lever 116 carries on its outer end the pivotal connections of the front and rear longitudinally extending tie rods 45.

In the operation of this embodiment of the device a turn of the steering hand wheel will also turn the worm gear 113 in a manner and with timing similar to that explained in the description of Fig. 3. The worm gear 113 meshes with an internal thread of the support block 114 and is therefore capable of shifting, during its turn, the outer end of the support lever 116 forwardly or backwardly which in turn will permit the superstructure to bank.

In all modifications of the invention illustrated and described, the basis of operation is provided by the banking vehicle itself which comprises, besides the superstructure with frame and running gear as described, a vehicle steering mechanism including in addition to the steering gear unit referred to previously, leverage and linkage such as the gear housing supported lever 117, a symmetrically arranged support lever 118 on the other side of the vehicle, and a tie rod 119 connecting the levers 117 and 118 by means of ball and socket joints on the ends of this tie rod. The levers 117 and 118 are carrying in the form of oppositely directed bell cranks the corresponding lever arms 120 and 121 which in turn support pivotally the steering drag links 122 and 123, which are pivotally supported on their outer ends by the steering arms 124 and 125. A turn on the vehicle steering hand wheel 54 operates the linkage and lever arm system and thereby steers the front wheels of the vehicle.

The various ways for operation of the resilient means according to the invention interposed between the force diverter and the source of operating power, may be the driver steering the vehicle or shifting a special lever, or the vehicle engine acting directly or by means of a power assist system to provide an elapse in time of various duration between stress change of the resilient means and banking turn of the superstructure, made possible by the fact that within selected time limits the release is operated in one direction only. Running gear vibrations can develop to increasingly dangerous proportions only, where movement in two directions is permitted.

Since force diverters are proposed for incorporation into the running gear systems of banking cars the sole purpose of making vibrations of dangerous magnitude impossible, the devices according to this invention will secure the desired safeguards.

Various modes of carrying out the invention are contemplated as within the scope of the following claims, particularly pointing out and distinctly claiming the subject matter which is regarded as the invention.

I claim:

1. In combination with a superstructure banking vehicle wherein the superstructure and running gear are connected in a manner providing for a wheel oscillation motion center zone located near the road and for a superstructure banking motion center zone located near the center of mass of the superstructure, means additionally connecting the superstructure and running gear and rigidly preventing relative lateral movement between the same, and means including resilient means responsive to forces under the control of the driver to release said means and provide for relative lateral movement between the superstructure and the running gear caused in effect by lateral forces such as the centrifugal force, as in banking of the superstructure.

2. The combination of claim 1 wherein said resilient means are actuated by the turn of the vehicle steering hand wheel turned to negotiate a curve in the road while the banking of the superstructure during the curve ride is effected by centrifugal forces.

3. A superstructure banking vehicle having a running gear arranged to provide for a wheel oscillation motion center located near the road and about which the vehicle will turn outwardly during curve ride and for a superstructure banking motion center located near the center of mass of the superstructure and about which the superstructure will turn during curve ride in a direction opposite to the first named turn, and comprising a self locking gear set connecting the superstructure and the running gear and constituting a force diverting device to block lateral turn of the superstructure about the banking motion center initiated by lateral force components resulting from forces exerted on the wheels, and means to operate said self locking gear set to permit lateral turn of the superstructure about the banking motion center in response to centrifugal forces exerted on the vehicle, said means including resilient means operated to secure a change in stress of the resilient means during actuation of the vehicle steering gear mechanism.

4. The combination of claim 3 wherein said resilient means are operated to secure a change in stress in response to forces exerted by the vehicle driver.

5. The combination of claim 3 wherein said resilient means are operated to secure a successive increase and decrease in stress in response to forces effected by the vehicle engine power and under the initiating control of the vehicle driver.

6. The combination of claim 3 wherein said resilient means are operated to secure a successive increase and decrease in stress in response to forces supplied by a fluid power system generated by the vehicle engine power.

7. A superstructure banking vehicle having a running gear arranged to provide for a wheel oscillation motion center located near the road and about which the vehicle will turn outwardly during curve ride and for a superstructure banking motion center located near the center of mass of the superstructure and about which the superstructure will turn during curve ride in a direction opposite to the first named turn, a vehicle steering mechanism including a reversible steering gear, means coordinating the relative lateral motion between the wheels and the superstructure during banking, and control means comprising in combination a speed-up train of gears and a self-locking reduction gear set interposed between said running gear and the superstructure, the improvement comprising a resilient control means arranged to operate said control means during operation of the vehicle steering gear mechanism, and resilient absorption means arranged to provide for operation of the vehicle steering mechanism after operation of said control means by said resilient control means.

8. The combination of claim 7 wherein the selective operation of said control means and said resilient absorption means is secured by a differential assembly constituting also said speedup train of gears, said differential assembly being operably interposed between the vehicle steering gear mechanism, said control means and said resilient control means.

9. The combination of claim 7 wherein the selective operation of said control means and said resilient absorption means is secured by a differential assembly constituting also said speedup train of gears, said differential assembly being operably interposed between the vehicle steering gear mechanism, said control means and said resilient control means and said differential assembly is operably connected to said reversible steering gear mechanism and is operating said control means including said self-locking reduction gear by means of a drive shaft with a universal joint-like connection interposed between said differential assembly and said drive shaft.

10. The combination of claim 7 wherein the selective operation of said control means and said resilient absorption means is secured by a differential assembly operably interposed between the vehicle steering gear mechanism, said control means and said resilient absorption means and wherein said differential assembly serves as a speed-up mechanism to increase the amount of turn from that secured on the steering column of the vehicle to a multiple turn thereof for the self-locking reduction gear set.

11. The combination of claim 7 wherein the selective operation of said control means and said resilient absorption means is secured by a differential assembly operably interposed between the vehicle steering gear mechanism, said control means and said resilient absorption means and comprising a drive pinion rotatably carried by a separate shaft arranged in line with the vehicle steering column, a drive ring gear, a differential case integrally connected to said drive ring gear and rotatably supporting a pair of differential side gears and rotatably supporting a pair of differential pinion gears, one of said pinion gears being connected to the shaft of said self-locking reduction gear set, the other one of said pinion gears being connected to the shaft operating said resilient absorption means.

12. The combination of claim 7 wherein the selective operation of said control means and said resilient absorption means is secured by a differential assembly operably interposed between the vehicle steering gear mechanism, said control means and said resilient absorption means and comprising a drive pinion rotatably carried by a separate shaft arranged in line with the vehicle steering column, a drive ring gear, a differential case integrally connected to said drive ring gear and rotatably supporting a pair of differential side gears and rotatably supporting a pair of differential pinion gears, one of said pinion gears being connected to the shaft of said self-locking reduction gear set, the other one of said pinion gears being connected to the shaft operating said resilient absorption means, and said steering column shaft carries a bell crank lever extending eccentrically and parallel to said steering column shaft and wherein said separate shaft carries the resilient control means comprising a pair of resilient spring leaves and a pair of rigid arms shaped to restrict deflection of said leaves over and above a selected amount, and wherein said separate shaft carries in addition a pair of rigid studs arranged to secure precompression for said leaves, said crank lever engaging one of the outer ends of said spring leaves during turn of the steering column, the resulting deflection providing the force for operation of said differential assembly and at least one said self-locking reduction gear set or said resilient absorption means.

13. The combination of claim 7 wherein the selective operation of said control means and said resilient absorption means is secured by a differential assembly operably interposed between the vehicle steering gear mechanism, said control means and said resilient absorption means and comprising a drive pinion rotatably carried by a separate shaft arranged in line with the vehicle steering column, a drive ring gear, a differential case integrally connected to said drive ring gear and rotatably supporting a pair of differential side gears and rotatably supporting a pair of differential pinion gears, one of said pinion gears being connected to the shaft of said self-locking reduction gear set, the other one of said pinion gears being connected to the shaft operating said resilient absorption means, and said steering column shaft carries a bell crank lever extending eccentrically and parallel to said steering column shaft and wherein said separate shaft carries the resilient control means comprising a pair of resilient spring leaves and a pair of rigid arms shaped to restrict deflection of said leaves over and above a selected amount, wherein said separate shaft carries in addition a pair of rigid studs arranged to secure precompression for said leaves, said crank lever engaging one of the outer ends of said spring leaves during turn of the steering column, the resulting deflection providing the force for operation of said differential assembly and at least one said self-locking reduction gear set or said resilient absorption means, and said rigid arms are shaped to secure continued turn of said separate shaft after absorption of said spring leaf deflection in response to continued operation of the steering column for the vehicle steering gear, turning said differential assembly and operating the resilient absorption means by shifting a spring engaging member which forms a nut-like operating unit by means of internal threads within said member engaging an external thread on the shaft operated by said differential assembly.

14. The combination of claim 7 wherein said vehicle steering mechanism is operably connected to a hydraulically operated power assist unit comprising a pump, a reservoir, a control valve assembly, a piston operated within a cylinder to exert pressure on the vehicle steering gear in a direction parallel to that exerted by the driver, said hydraulically operated power assist unit thereby assisting in the operation of the resilient control means and either singly or in combination in the operation of said self-locking gear set and of said resilient absorption means.

15. A superstructure banking vehicle having a running gear arranged to provide for a wheel oscillation motion center located near the road and about which the vehicle will turn outwardly during curve ride and a superstructure banking motion center located near the center of mass of the superstructure and about which the superstructure will turn during curve ride in a direction opposite to the first named turn, means including longitudinally extending rods to coordinate the relative motion between the wheels and the superstructure during banking, and control means comprising in combination a speed-up train of gears and a self-locking reduction gear set interposed between said running gear and the superstructure, resilient control means comprising a coil spring placed into a cylindrical housing and extending between two interior flanges thereof, a piston adapted to engage one end of said spring during turn of a frame-supported lever in one direction and to engage the other end of said spring during the turn of said last-named lever in the other direction, said last-named lever being operated in effect by the driver of the vehicle, and the resulting compression of the spring being transferred by means of said cylindrical housing to the operating lever for the speed-up train of gears as part of said control means controlling the relative position between said superstructure and said running gear of the vehicle during curve ride.

16. A superstructure banking vehicle having a running gear arranged to provide for a wheel oscillation motion center located near the road and about which the vehicle will turn outwardly during curve ride and for a superstructure banking motion center located near the center of mass of the superstructure and about which the superstructure will turn during curve ride in a direction opposite to the first named turn, means including longitudinally extending rods to coordinate the relative motion between the wheels and the superstructure during banking, and control means comprising in combination a speed-up train of gears and a self-locking reduction gear set interposed between said running gear and the superstructure, resilient control means comprising a coil spring placed into a cylindrical housing and extending between two interior flanges thereof, a piston adapted to engage the ends of said spring alternately during turn of an engine driven crank shaft lever in either direction, the resulting compression of the spring being transferred by means of said cylindrical housing to the operating lever for the speed-up train of gears as part of said control means controlling the relative position between said superstructure and said running gear of the vehicle during curve ride.

17. In a superstructure banking vehicle, a running gear comprising paired front and rear wheels and wheel carrying members, linkage and resilient support means extending between the wheel carrying members and intermediate support members providing a wheel deflection center zone located near the road about which the vehicle turns during curve ride, and pivotal means arranged between said intermediate support members and the superstructure and providing a superstructure banking motion center zone located near its center of mass; means coordinating the relative motion between the wheels and the superstructure during banking, force diverting control means comprising in combination a speed-up train of gears and a self-locking reduction gear set interposed between said running gear and the superstructure, a resilient control means comprising a spring precompressed between suitably shaped flanges of a housing, a piston shaped to engage either end of said precompressed spring, the free end of said piston being pivotally attached to a crank lever operated in effect by the vehicle engine, the free end of the housing being pivotally attached to said force diverting control means, said resilient control means operating successively in either direction at predetermined intervals, eliminating periodically opposition to lateral shifting of said superstructure relative to said running gear, and thereby securing banking turn of the superstructure during curve ride whenever centrifugal forces tend to turn the superstructure about said wheel deflection center zone.

18. In a superstructure banking vehicle wherein the superstructure is adapted to move laterally relative to the running gear in response to centrifugal forces on a road curve, gear means connecting the superstructure and the running gear and constructed to be self-locking as to relative lateral forces therebetween, and means including resilient means carried by the superstructure to actuate said gear means to free the same for relative lateral movement between the superstructure and running gear during banking while retaining said locking as against other than centrifugal forces on the superstructure, said resilient means being actuated by leverage engaged by the driver assisted by hydraulic power assist means.

19. The construction of claim 18 wherein the running gear comprises at least one pair of roll banking arms having means interconnecting the same, and said gear means and resilient control means are disposed between the superstructure and said interconnecting means.

20. A vehicle comprising a superstructure adapted to roll bank on turns, at least one set of roll banking arms being disposed to support each corresponding end of the superstructure upon a pair of wheels, each set being connected to the superstructure and constituting at least a pair of opposed roll banking arms spaced laterally apart on opposite sides of the longitudinal center line of the superstructure and extending from the superstructure to the effective road support therefor with the ends of the arms for each pair of roll banking arms embodying in effect a universally movable joint at one corresponding end of each arm and a skew pivotally effective banking axis at the other end of the arm, means including longitudinally extending levers located intermediate the wheels and interconnecting the roll banking arms of each pair to retain said effective universally movable joints for the corresponding pair in substantially constant spaced relation, each roll banking arm including a wheel suspension arm comprising a transversely and a longitudinally extending leg, a king pin banking hinge pivotally interconnecting the outer ends of said legs and placed to provide said skew pivotally effective banking axis, the longitudinally extending leg of each pair constituting the resilient support for the corresponding part of the superstructure, additional resilient means and related guiding means disposed to roll the superstructure into a banked position during curve ride, a tie interconnecting the front and rear superstructure support structure, a self-locking reduction gearing carried by the superstructure and connected to said tie to block relative lateral shifting between the superstructure and wheels tending to result from wheel road shock forces, and resilient control means operable in response to vehicle front wheel steering operation to actuate said reduction gear in a direction adjusting said blocking to provide for movement of said tie and banking of the superstructure.

21. A vehicle comprising a superstructure adapted to roll bank on turns, a set of front and a set of rear wheel carriers disposed to support said superstructure and spaced longitudinally of the same, each front wheel carrier comprising a wheel spindle member, an upper wheel suspension arm pivotally connected at its inner end to the superstructure, a ball and socket joint connecting said arm to said wheel spindle member, a lower wheel suspension arm composed of a transversely and a longitudinally extending leg, a universal joint connecting each longitudinally extending leg at its inner end of the superstructure, an inclined king pin banking hinge connecting each longitudinally extending leg at its outer end to the corresponding transverse leg intermediate the ends of the latter, a pivotal support for the inner ends of said transverse legs pivotally carried by the superstructure, a ball and socket joint connecting the outer end of each transverse leg to the corresponding wheel spindle member, and lever means stabilizing the position of said pivotal support to control the banking of the superstructure on turns, said longitudinally extending legs constituting means for resiliently supporting the superstructure upon said front wheel carriers, a front to rear tie connecting at least one wheel carrier disposed in the front of the vehicle to one wheel carrier disposed in the rear of the vehicle to induce the front and rear wheel carriers to move laterally substantially in unison during the roll banking of the superstructure, means connecting the superstructure and said front to rear tie including irreversible gear mechanism and rigidly preventing relative lateral movement between the wheels and the superstructure, and means including resilient control means responsive to vehicle engine forces to release said preventive means to permit relative lateral movement between the superstructure and the running gear for banking of the superstructure.

References Cited in the file of this patent

UNITED STATES PATENTS 932,333     Schmelz _____ Aug. 24, 1909